Nov. 28, 1939.                R. S. McNEIL                 2,181,246
                              COFFEE MAKER
                          Filed Sept. 29, 1937
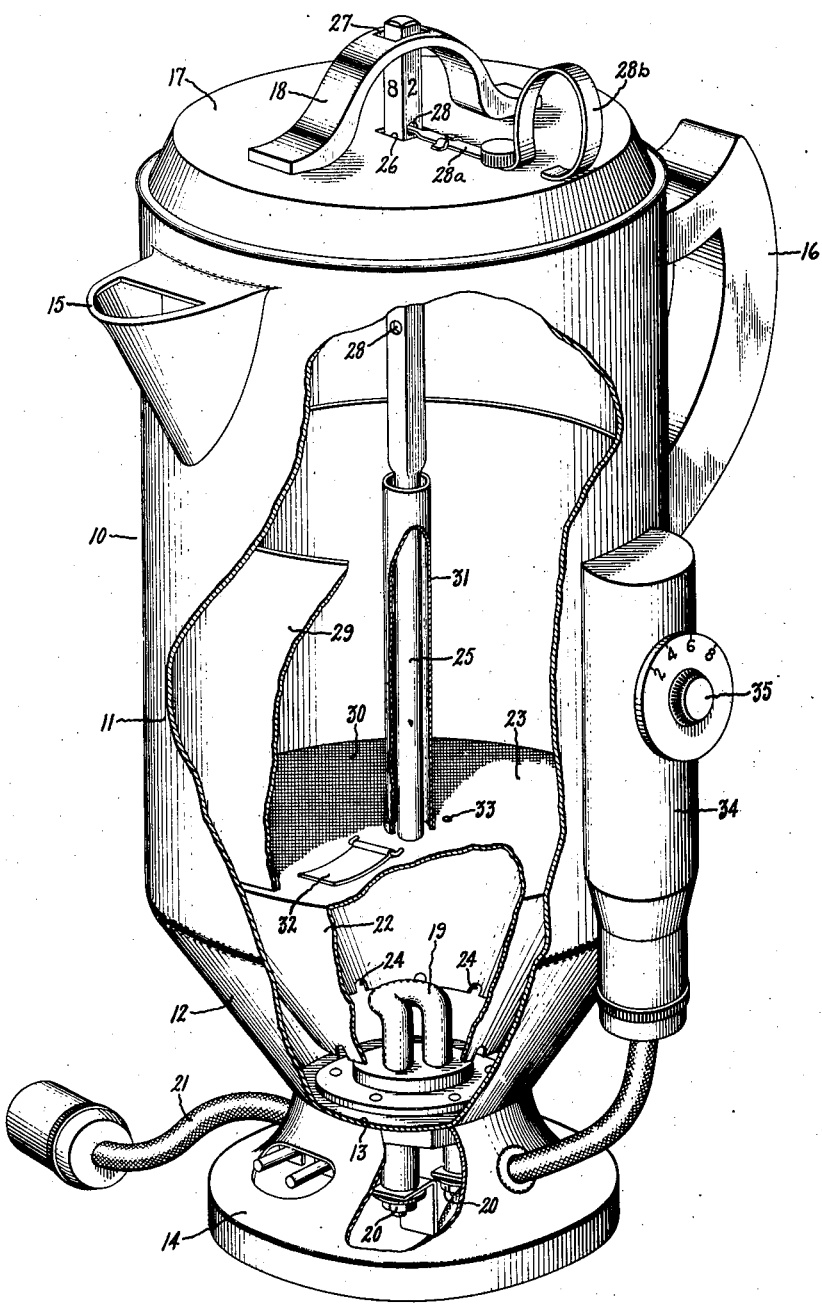
Inventor:
Roderick S. McNeil,
by Harry E. Dunham
His Attorney.

Patented Nov. 28, 1939

2,181,246

UNITED STATES PATENT OFFICE 2,181,246

COFFEE MAKER

Roderick S. McNeil, Bridgeport, Conn., assignor to General Electric Company, a corporation of New York Application September 29, 1937, Serial No. 166,313

7 Claims. (Cl. 53—3)

This invention relates to coffee makers, and it has for its object the provision of an improved device of this character.

More specifically, this invention relates to improvements in coffee makers of the type described and claimed in the copending application of Otto R. Schurig, Serial No. 156,736, filed July 31, 1937 and assigned to the same assignee as this invention. As there disclosed, the Schurig coffee maker comprises a coffee infusion receptacle in which are placed a ground coffee container and a bell-shaped member below the coffee container. The bell-shaped member is arranged to be moved upwardly in the infusion receptacle by the generation of pressure under the bell so as to move the ground coffee container up out of the coffee brew after the brew has been made.

My invention contemplates the provision of a coffee maker of this type wherein it is possible to conveniently make either a very small or a large quantity of coffee, as desired. In other words, it is possible in my coffee maker to make as small a quantity of coffee as one or two cups, or any number up to the maximum for which the coffee maker is designed, for example eight cups.

In accordance with this invention, the bottom portion of the infusion receptacle in which the coffee is made, and also the bell-shaped member are provided with conically shaped walls so that a material liquid head is provided for the bell-shaped member in the lower portion of the receptacle even though a relatively small quantity of water is used.

In addition to this, I have provided suitable latching or locking means which automatically holds the coffee grounds out of the water after the coffee brew has been made and the coffee grounds have been elevated out of the brew by the bell member. The bell-operating member elevates the coffee grounds to different heights when different quantities of coffee are made, and so I have arranged my latching device to automatically lock the coffee grounds in their maximum elevated position in each case.

For a more complete understanding of this invention, reference should be had to the accompanying drawing in which the single figure is a perspective view of a coffee maker embodying this invention, parts being broken away so as to illustrate certain details of construction.

Referring to the drawing, this invention has been shown in one form as applied to a coffee maker having a water infusing or steeping vessel 10. The vessel 10 is provided with an upright cylindrical portion 11, and a bottom portion 12 formed as an inverted frustrum of a cone, as clearly shown in the figure. The tapered bottom portion 12 terminates in a bottom wall 13. Preferably and as shown, the wall portions 11, 12 and 13 will be formed integrally with each other. The integral unit is mounted upon a suitable base 14.

At the upper part of the cylindrical portion 11 there is provided a pouring spout 15 and a handle 16 opposite it. This portion is closed at the top by means of a cover 17 having a handle 18.

Inserted through the bottom wall 13 is a suitable heating element 19 which may have any suitable construction, and which preferably will be of the sheathed type such as described and claimed in the United States patent to C. C. Abbott No. 1,367,341, dated February 1, 1921. As shown, this unit is roughly in the shape of a hairpin, and it projects up into the conical portion 12. The heating element is provided with terminals 20 in the base portion 14 and to these terminals are connected a suitable electrical supply cord 21.

Mounted within the vessel 10 is a bell-shaped member 22 which also is formed in the shape of a frustrum of a cone. As shown, this frustrum is somewhat smaller than is the conical section 12 of the vessel 10. The bell 22 is closed at the top by a wall 23, and is open at the bottom, as shown. The bottom edge of the side walls of the bell is provided with a series of notches 24 spaced at intervals circumferentially as shown.

Mounted on and substantially in the center of the top wall 23 of the bell is a vertical rod 25 that extends upwardly through the vessel 10 and projects through an opening 26 provided for it in the cover 17. It also extends through an opening 27 provided for it in the handle 18. The lower section of the rod 25 is round while the upper section preferably will be square, as shown. This upper section is provided with a series of vertically spaced notches 28 directed through the four sides respectively of the square section; more specifically, it is provided with four of these notches 28. These notches range from the top one shown above the lid 17 in the drawing to the lower one in the adjacent side shown in the vessel 10.

A latch 28a is arranged to be received selectively in the notches 28, as will be pointed out in greater detail hereinafter. The latch is biased inwardly into locking relation with the notches by means of a spring 28b.

Also mounted within the vessel 10 is a coffee container 29 of cylindrical form. This member at the bottom is provided with a mesh or screen bottom wall 30, and in the center with a tubular member 31 that rises upwardly from this bottom wall to surround the rod 25. The member 31 is connected to the side walls 29 in any suitable manner as by means of spokes or a spider (not shown). The container 29 is spaced from the top wall 23 of the bowl by means of a suitable stop 32.

In the operation of my coffee maker, it will be understood that a suitable quantity of water will be placed within the vessel 10, the quantity depending upon the amount of coffee brew it is desired to make. After the water has been placed within the vessel 10, the bell 22 will be inserted in the vessel. The bell is provided in its top wall with an opening 33 through which air under the bell is permitted to escape, so that the bell can sink until its bottom edge rests on the bottom wall 13 of the infusion receptacle. Then the coffee container 29 will be placed in the vessel with the coffee grounds in it, or if desired these grounds may be placed within the vessel 29 after it has been placed within the vessel 10. The cover 17 will then be placed on the coffee maker with the latch member opposite the particular side of the square section of the rod 25 that has the particular notch 28 corresponding with the quantity of water placed within the vessel 10. To facilitate the adjustment of the latch to the sides of the square section, numerals, such as 2, 4, 6, 8, denoting the various numbers of cups that may be made are placed on the square section, as shown. If it is desired to make two cups, the latch will be placed opposite the side bearing the numeral 2.

When the heater 19 is energized, it will heat the water within the bell 22, and as this water is heated a pressure will develop above the surface of the water in the bell. This pressure will gradually increase and eventually will become sufficiently great to elevate the bell and also the coffee container 29 in the vessel 10. As the bell rises it moves into a zone of relatively cool water above it. This chills the bell and thereby reduces the pressure in the bell; as a result, the bell drops down again. Again the heater 19 generates sufficient pressure to elevate the bell. This cycle of operation is repeated until the water throughout the vessel 10 is substantially uniformly heated, whereupon the pressure generated under the bell will elevate it sufficiently high to cause the latch 28a to pass into the proper notch 28 in the rod 25. This will hold the coffee container 29 with the coffee grounds in it in an elevated position substantially above the level of the coffee brew.

If a larger number of cups is to be made, the latch will be positioned opposite the surface of the square corresponding to the larger number. In each case, the notch 28 is so located that after the coffee brew has been made, the coffee grounds will be suspended out of the finished coffee brew. The larger the number of cups made the higher will the ground coffee container be suspended, and the lower will be the corresponding notch 28. It will be understood that the conically shaped bottom wall 12 and the similarly shaped bell 22 provide a water head or level sufficiently high to provide for proper functioning of the bell even though a relatively small quantity of water be used.

When the coffee brew has been made, the top wall 17 with the rod 28, the bell 22 and the coffee container 29 all may be removed as a unit from the vessel 10, or if desired they all may be left within this vessel.

A suitable thermostatic device 34 for controlling the heating element 19 is mounted on the vessel 10. It is adjusted to cut off the heating element 19 after the coffee brew has been made and the coffee container 29 has been elevated out of the brew. The thermostat may be of any suitable construction, but preferably will be of the bimetallic type arranged in heat conducting relation with the wall of vessel 10, and adjustable by means of a suitable knob 35. This knob 35 will be set to the number of cups made and is provided with numerals 2, 4, 6 and 8 to facilitate the adjustment.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States is:

1. A coffee maker comprising an infusion receptacle, a bell in the bottom of said receptacle movable upwardly by the generation of pressure under it when the water in the bell is heated, means for heating said water, a coffee container in said receptacle engaged by said bell so as to be moved upwardly when the bell moves upwardly, and the receptacle and bell having side walls that taper inwardly as they approach the bottom of said receptacle so that when a relatively small quantity of water is used a sufficiently high water level is established in said receptacle to cause the bell to rise when the liquid in the bell is heated to generate pressure under the bell.

2. A coffee maker comprising an infusion receptacle, a bell in the bottom of said receptacle movable upwardly by the generation of pressure under it when the liquid in the bell is heated, the bottom sections of the infusion receptacle and the bell having inwardly tapering walls as they approach the bottom of the infusion receptacle, a rod extending upwardly from said bell, a coffee container about said rod, latching means for selectively holding said rod at different levels in said container, and means for heating the liquid under said bell.

3. A coffee maker comprising an infusion receptacle, a bell in the bottom of said receptacle movable upwardly by the generation of pressure under it when the liquid in the bell is heated, the bottom sections of the infusion receptacle and the bell having inwardly tapering walls as they approach the bottom of the infusion receptacle, a rod extending upwardly from said bell having at its upper end a square section, the sides of which have notches at different levels, a latch arranged to be selectively positioned opposite said square sides and arranged to be received in the notches in said sides, a coffee container around said rod so as to be elevated in said receptacle when said bell rises, and means for heating the liquid under said bell.

4. A coffee maker comprising an infusion receptacle, a bell in the bottom of said receptacle movable upwardly by the generation of pressure under it when the liquid in the bell is heated, the bottom sections of the infusion receptacle and the bell having inwardly tapering walls as they approach the bottom of the infusion receptacle, a rod extending upwardly from said bell having at its upper end a plurality of sections with notches at different levels corresponding to different numbers of cups of coffee, a latch arranged to be selectively positioned opposite said sections and to be directed into said notches, a coffee container supported by said bell so as to be elevated in said receptacle when said bell rises, and means for heating the liquid under said bell.

5. A coffee container comprising an infusion receptacle, a bell in the bottom of said receptacle movable upwardly by the generation of pressure under it when the liquid in the bell is heated, a rod extending upwardly from said bell having at its upper end a square section, the sides of which have notches at different levels, a latch arranged to be selectively positioned opposite said square sides and arranged to be received in the notches in said sides, a coffee container supported by said bell so as to be elevated in said receptacle when said bell rises, and means for heating the liquid under said bell.

6. A coffee maker comprising an infusion receptacle, a bell in the bottom of said receptacle movable upwardly by the generation of pressure under it when the liquid in the bell is heated, a rod extending upwardly from said bell having at its upper end a plurality of sections with notches at different levels corresponding to different numbers of cups of coffee, a latch arranged to be selectively positioned opposite said sections and to be directed into said notches, a coffee container supported by said bell so as to be elevated in said receptacle when said bell rises, and means for heating the liquid under said bell.

7. A coffee maker comprising an infusion receptacle, a bell in the bottom of said receptacle movable upwardly by the generation of pressure under it when the liquid in the bell is heated, the bottom sections of the infusion receptacle and the bell having inwardly tapering walls as they approach the bottom of the infusion receptacle, a rod extending upwardly from said bell, a coffee container supported by said bell, latching means for selectively holding said rod at different levels in said container, and means for heating liquid under said bell.

RODERICK S. McNEIL.